United States Patent
Wells et al.

(10) Patent No.: US 10,915,307 B2
(45) Date of Patent: Feb. 9, 2021

(54) AUTOMATICALLY PRODUCING SOFTWARE IMAGES

(71) Applicant: Cisco Technology, Inc., San Jose, CA (US)

(72) Inventors: Ian James Wells, San Jose, CA (US); Santosh Ramrao Patil, Santa Clara, CA (US); Christopher Metz, Danville, CA (US); Durgaprasad Sukhadeo Pawar, Santa Clara, CA (US); Avaneesh Anandrao Kadam, San Jose, CA (US); Vikram Prasad Munishwar, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/902,604

(22) Filed: Feb. 22, 2018

(65) Prior Publication Data
US 2019/0258464 A1  Aug. 22, 2019

(51) Int. Cl.
  *G06F 9/44* (2018.01)
  *G06F 8/61* (2018.01)
  *G06F 8/70* (2018.01)
  *G06F 8/35* (2018.01)
  *G06F 8/36* (2018.01)
  *G06F 9/445* (2018.01)

(52) U.S. Cl.
  CPC .................. *G06F 8/63* (2013.01); *G06F 8/35* (2013.01); *G06F 8/70* (2013.01); *G06F 8/36* (2013.01); *G06F 9/44505* (2013.01)

(58) Field of Classification Search
  CPC .............. G06F 11/302; G06F 11/3051; G06F 11/3692; G06F 8/63; G06F 8/35; G06F 8/70
  See application file for complete search history.

(56) References Cited

U.S. PATENT DOCUMENTS

| | | | |
|---|---|---|---|
| 8,037,449 B2 | 10/2011 | Iborra et al. | |
| 8,584,121 B2 | 11/2013 | Arcese et al. | |
| 9,471,358 B2 | 10/2016 | Goel et al. | |
| 9,762,438 B2 | 9/2017 | Anerousis et al. | |
| 2014/0012532 A1* | 1/2014 | Spitzer | G06F 9/44505 702/127 |

(Continued)

*Primary Examiner* — Chat C Do
*Assistant Examiner* — Lenin Paulino
(74) *Attorney, Agent, or Firm* — Edell, Shapiro & Finnan, LLC (57) ABSTRACT

In one embodiment, a server generates expected levels of capability associated with possible combinations of settings for first and second adjustable parameters for an aspect of a software image feature. The server receives an indication of a desired level of capability for the aspect of the software image feature and, based on the indication, identifies a particular expected level of capability associated with a particular possible combination of the settings for the first and second adjustable parameters. The particular expected level of capability is closer to a desired level of capability for an aspect of a software image feature than the other expected levels of capability associated with the possible combinations of the settings for the first and second adjustable parameters. The server produces a software image that includes the particular possible combination of the settings for the first and second adjustable parameters.

20 Claims, 8 Drawing Sheets

(56) References Cited

U.S. PATENT DOCUMENTS

2016/0092404 A1    3/2016  Farouki et al.
2016/0307133 A1*  10/2016  Kour ................ G06Q 10/06313
2017/0024396 A1*  1/2017  Adarsh ................ G06Q 10/06
2019/0018671 A1*  1/2019  Zhu ........................... G06F 8/60

* cited by examiner

| COMPILE-TIME FLAGS | -VERBOSE_LOGGING 220(3) | HIGH DEBUGABILITY (100%) |
|---|---|---|
| | -MAX_MEMORY 220(1) 0MB - 256MB | 25% PERFORMANCE |
| | -MAX_MEMORY 220(1) 257MB – 512MB | 50% PERFORMANCE |
| | -MAX_MEMORY 220(1) 513MB – 1GB | 75% PERFORMANCE |
| | -MAX_MEMORY 220(1) 1GB – 2GB | 100% PERFORMANCE |
| LINK-TIME FLAGS | -LIB_APP_ANALYTICS 220(4) | HIGH DEBUGABILITY (100%) |
| | -LIB_FAST_PATH 220(2) | HIGH PERFORMANCE (100%) |

FIG.3

| | LIB AND PACKAGES | PERFORMANCE | LATENCY | DEBUGABILITY |
|---|---|---|---|---|
| FIREWALL | CORE PKG:<br>MAPPING-TABLE PKG<br>OPENDNS PKG<br>...<br>DEPENDENCY PKG:<br>IPV4 PKG<br>IPV6 PKG<br>SECURITY PKG<br>MEM-MGMT PKG<br>FAST-PATH PKG<br>... | COMPILE TIME INSTRUCTION:<br>ENABLE PERFORMANCE FLAG<br>ENABLE IN-MEMORY OPERATION<br>ENABLE HIGH-PERF ALLOCATION<br>...<br>ADDITIONAL PACKAGES:<br>SUDO APT-GET INSTALL PERF-MEM<br>... | IMAGE PREFERENCE:<br>COMBINE WITH<br><br>NAT<br>...<br>ADDITIONAL PACKAGES:<br>FAST-PATH PKG | IMAGE PREFERENCE:<br>INDEPENDENT IMAGE<br>COMPILE TIME INSTRUCTION:<br>ENABLE DEBUG FLAG<br>ENABLE LOGGER INFRA<br>...<br>ADDITIONAL PACKAGES:<br>SUDO APT-GET INSTALL APPDYNAMICS<br>SUDO APT-GET INSTALL DEBUG-DOG<br>SUDO APT-GET INSTALL LOGGER<br>... |

| | | | |
|---|---|---|---|
| DHCP | CORE PKG:<br>DHCP PKG<br>IP-ALLOCATION PKG<br><br>DEPENDENCY PKG:<br>IPV4 PKG<br>IPV6 PKG<br>MEM-MGMT PKG | COMPILE TIME INSTRUCTION:<br>ENABLE PERFORMANCE FLAG<br>ENABLE IN-MEMORY OPERATION<br>ENABLE HIGH-PERF ALLOCATION<br>...<br>...<br>ADDITIONAL PACKAGES:<br>SUDO APT-GET INSTALL PERF-MEM<br>... | IMAGE PREFERENCE: COMBINE WITH<br>...<br>...<br>ADDITIONAL PACKAGES:<br>FAST-PATH PKG | IMAGE PREFERENCE:<br>INDEPENDENT IMAGE<br>COMPILE TIME INSTRUCTION:<br>ENABLE DEBUG FLAG<br>ENABLE LOGGER INFRA<br>...<br>ADDITIONAL PACKAGES:<br>SUDO APT-GET INSTALL APPDYNAMICS<br>SUDO APT-GET INSTALL DEBUG-DOG<br>SUDO APT-GET INSTALL LOGGER<br>... |

| | CORE PKG:<br>NAT PKG<br>MAPPING-TABLE PKG | COMPILE TIME INSTRUCTION:<br>ENABLE PERFORMANCE FLAG<br>ENABLE IN-MEMORY OPERATION<br>ENABLE HIGH-PERF ALLOCATION<br>...<br>ADDITIONAL PACKAGES:<br>SUDO APT-GET INSTALL PERF-MEM<br>... | IMAGE PREFERENCE: COMBINE WITH FIREWALL<br>...<br>ADDITIONAL PACKAGES:<br>FAST-PATH PKG<br>... | IMAGE PREFERENCE:<br>INDEPENDENT IMAGE<br>COMPILE TIME INSTRUCTION:<br>ENABLE DEBUG FLAG<br>ENABLE LOGGER INFRA<br>...<br>ADDITIONAL PACKAGES:<br>SUDO APT-GET INSTALL APPDYNAMICS<br>SUDO APT-GET INSTALL DEBUG-DOG<br>SUDO APT-GET INSTALL LOGGER<br>... |
|---|---|---|---|---|
| NAT | DEPENDENCY PKG:<br>IPV4 PKG<br>IPV6 PKG<br>MEM-MGMT PKG | | | |
| ... | | | | |

AUTOMATICALLY PRODUCING SOFTWARE IMAGES

TECHNICAL FIELD

The present disclosure relates to software images.

BACKGROUND

A software image/package may include a collection of software modules, each configured to perform one or more specialized tasks. Software vendors can offer software images for users/administrators to install and run. Satisfying overall system specifications places requirements on how the software is deployed. Accordingly, users frequently have varying requirements for these software images.

DESCRIPTION OF EXAMPLE EMBODIMENTS

Overview

In one embodiment, a software image production server stores a first mapping of (1) respective settings for a first adjustable parameter for an aspect of a software image feature to (2) first respective values that represent expected levels of capability for the respective settings for the first adjustable parameter. The software image production server also stores a second mapping of (1) respective settings for a second adjustable parameter for the aspect of the software image feature to (2) second respective values that represent expected levels of capability for the respective settings for the second adjustable parameter. The software image production server generates expected levels of capability associated with possible combinations of the settings for the first and second adjustable parameters based on the first respective values and the second respective values. The software image production server receives an indication of a desired level of capability for the aspect of the software image feature and, based on the indication, identifies a particular expected level of capability associated with a particular possible combination of the settings for the first and second adjustable parameters, wherein the particular expected level of capability is closer to the desired level of capability than the other expected levels of capability associated with the possible combinations of the settings for the first and second adjustable parameters. The software image production server produces a software image that includes the particular possible combination of the settings for the first and second adjustable parameters.

Example Embodiments

Figure 1:
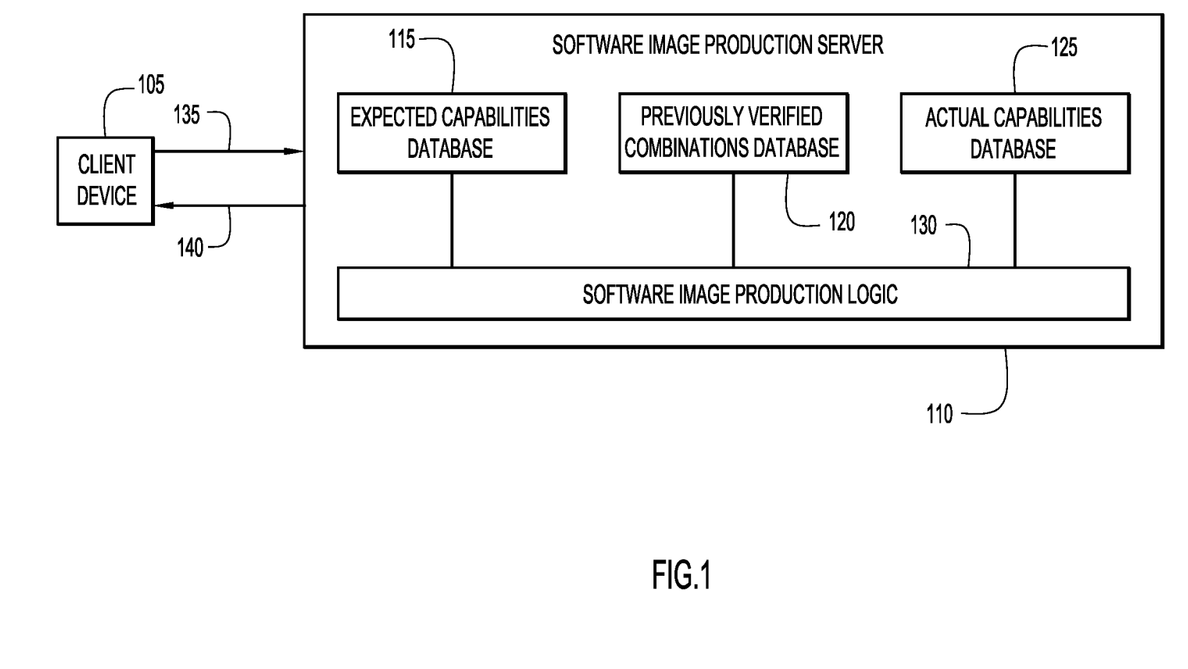
FIG. 1 is a system configured to automatically produce software images based on expected levels of capability, according to an example embodiment.

With reference made to FIG. 1, shown is a system configured to automatically produce software images based on expected levels of capability, in accordance with examples presented herein. The system includes a client device 105 and a software image production server 110. The software image production server 110 includes expected capabilities database 115, previously verified combinations database 120, and actual capabilities database 125. The software image production server 110 also includes software image production logic 130.

The software image production server 110 may be operated by a software vendor, and the client device 105 may be operated by a user of services provided by the software vendor. In particular, the software vendor provides software images for the user to install and run. In one example, the software vendor supplies hardware and software for network elements (e.g., switches, routers, etc.), and the software image includes software for a network element. In this example, the user may be a network administrator of an enterprise network that includes network elements supplied by the software vendor.

Conventionally, software images are monolithic and have a large set of features. Such software images are built as a single static image containing all the offered features. Monolithic software images are difficult to debug and test because of the sheer volume and combinations of software features. Identifying the cause of a problem is difficult because there are so many possible causes that only a few can actually be tested, and interactions between certain combinations can easily be missed. Additionally, the user cannot rely on whether their specific use case has been tested explicitly.

At the other extreme, large software images may be provided as hundreds of individual user-selectable features. However, such software images are associated with high complexity because the user must combine appropriate features of the software image and associated dependencies while preventing unexpected interactions. As a result, this manual mechanism is highly prone to human error.

Another conventional approach is to maintain images per individual feature, per release. In this approach, independent features need not be built together, and may be combined using Virtual Machines (VMs), containers, etc. to keep the individual features independent (a microservice model). However, moving packets between VMs or containers is expensive, and often requires excess memory copying or Direct Memory Access (DMA) bandwidth in the system. Considering the number of features (and the fact that some features interact and may need to be supplied together), this approach has the logistical problem of maintaining static images to satisfy these combinations for each release of a given product/platform.

As such, provided are techniques for automatically producing a software image having an expected level of capability for a combination of settings for adjustable parameters for aspects of a software image feature that is closest to a desired level of capability for that aspect of the software image feature. These techniques thereby improve software image producing technology by automating software image production in accordance with the examples described herein. These techniques may also ensure that the software images have features with expected levels of capability that match desired levels of capability. For example, these techniques may improve the stability, performance, debugability, latency, resources/environment, and/or compatibility of software image features.

Figure 2:
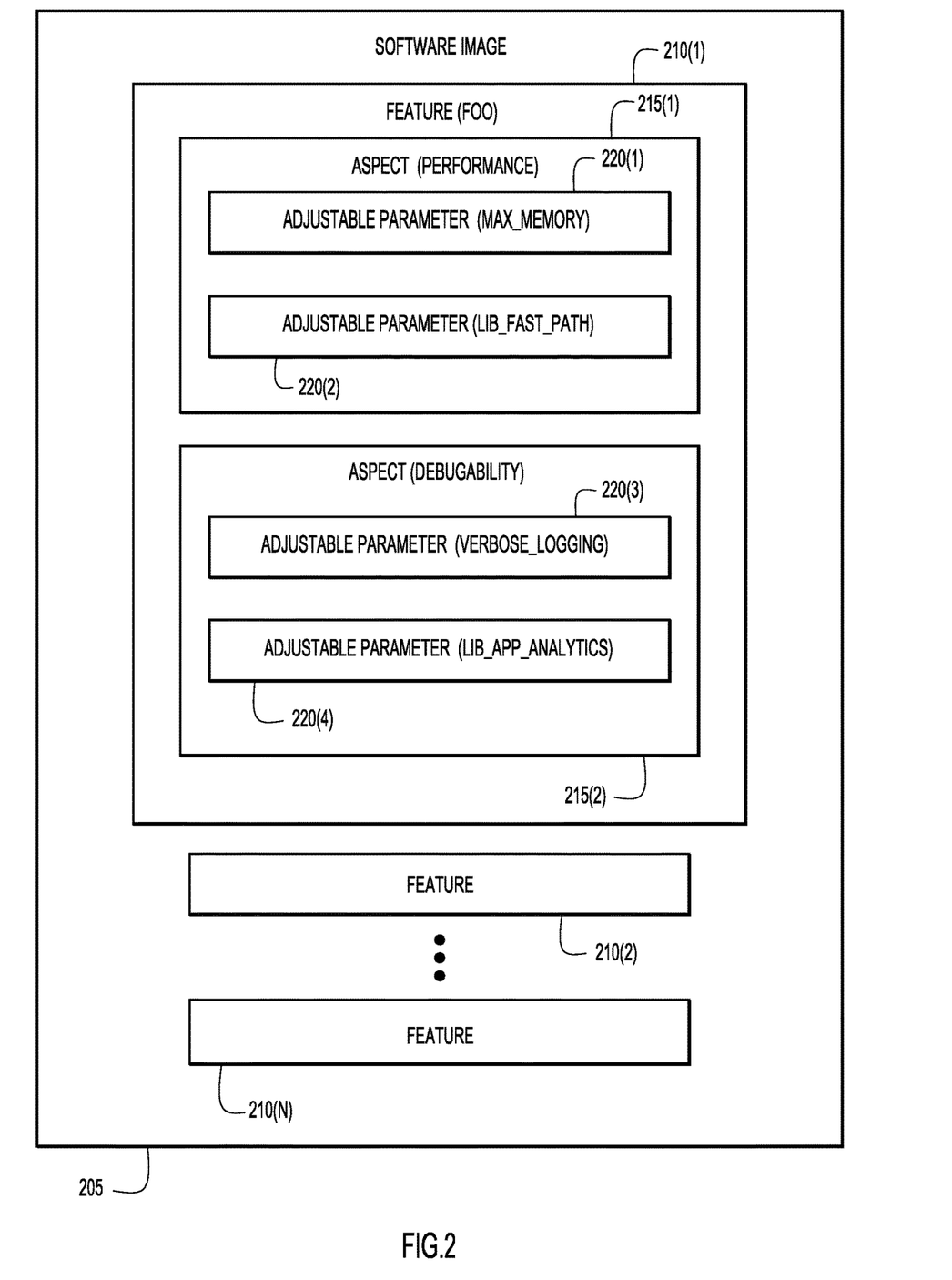
FIG. 2 is a block diagram of a logical representation of a software image, according to an example embodiment.

FIG. 2 is a block diagram of a logical representation of a software image 205 automatically produced by software image production server 110 in accordance with the techniques presented herein. Software image 205 includes software image features 210(1)-210(N). Each software image feature 210(1)-210(N) includes one or more aspects. For example, feature 210(1) includes aspects 215(1)-215(2). Each aspect of the software image features 210(1)-210(N) includes one or more adjustable parameters. For example, adjustable parameters 220(1)-220(2) are adjustable parameters for aspect 215(1), and adjustable parameters 220(3)-220(4) are adjustable parameters for aspect 215(2). There may be any number of aspects of a feature, and any number of adjustable parameters for the aspects.

In one example, software image 205 is for a router (e.g., Cisco Systems, Inc.'s Cloud Services Router (CSR)). Software image features 210(1)-210(N) may enable the router to perform various services/functions. For example, software image feature 210(2) may relate to a firewall function/service, software image feature 210(3) may relate to a Dynamic Host Configuration Protocol (DHCP) function/service, software image feature 210(4) may relate to a Network Address Translation (NAT) function/service, etc. As shown in FIG. 2, software image feature 210(1) is generically referred to as "Foo".

There may be various aspects (e.g., aspects 215(1)-215(2)) of a software image feature (e.g., software image feature 210(1)) that a user may wish to configure/control/set. Aspects of software image features may include, for example, performance, debugability, etc. As shown, aspect 215(1) is performance. Performance in this context may relate to the response time or processing speed of software image feature 210(1) (which may affect the overall performance of software image 205). Performance of software image 205 may be improved by enabling specific compilation options, for example options regarding resource allocation. By contrast, providing minimal resources for software image size and verbosity for debugging may limit performance. Performance may also be improved by compiling or packaging features together to avoid, e.g., context switches or copying data over security boundaries.

As further shown in FIG. 2, aspect 215(2) is debugability. In this context, debugability may refer to ease of debugging software image feature 210(1) during deployment (e.g., early deployment). Software image feature 210(1) may be easier to debug if software image feature 210(1) is independent (well-separated) from the other software image features 210(2)-210(N) included in the software image 205. Including special debugging information in software image feature 210(1) and flagging that information during compilation may also improve debugability. By contrast, compiling related software image features together or packaging software image features in a single software image may limit debugability. Debugability may also be improved by packaging various helper tools (e.g., Wireshark®, etc.) with the software image 205.

Adjustable parameters 220(1)-220(2) may affect aspect 215(1) (e.g., performance) of feature 210(1). As explained in greater detail below, adjustable parameter 220(1) may be max_memory, and adjustable parameter 220(2) may be lib_fast_path. In addition, adjustable parameters 220(3)-220(4) may affect aspect 215(2) (e.g., debugability) of feature 210(1). As further explained below, adjustable parameter 220(3) may be verbose_logging, and adjustable parameter 220(4) may be lib_app_analytics.

The software vendor may provide, to the software image production server 110 (FIG. 1), a mapping of respective settings for adjustable parameter 220(1) (max_memory) to respective values that represent expected levels of capability for the respective settings for adjustable parameter 220(1). The software vendor may further provide, to the software image production server 110, a mapping of respective settings for adjustable parameter 220(2) (lib_fast_path) to respective values that represent expected levels of capability for the respective settings for adjustable parameter 220(2). These expected levels of capability may be a measure of the impact of the adjustable parameters 220(1)-220(2) on aspect 215(1) (performance). The software vendor may also provide similar mappings for adjustable parameters 220(3)-220(4) for aspect 215(2).

Figure 3:
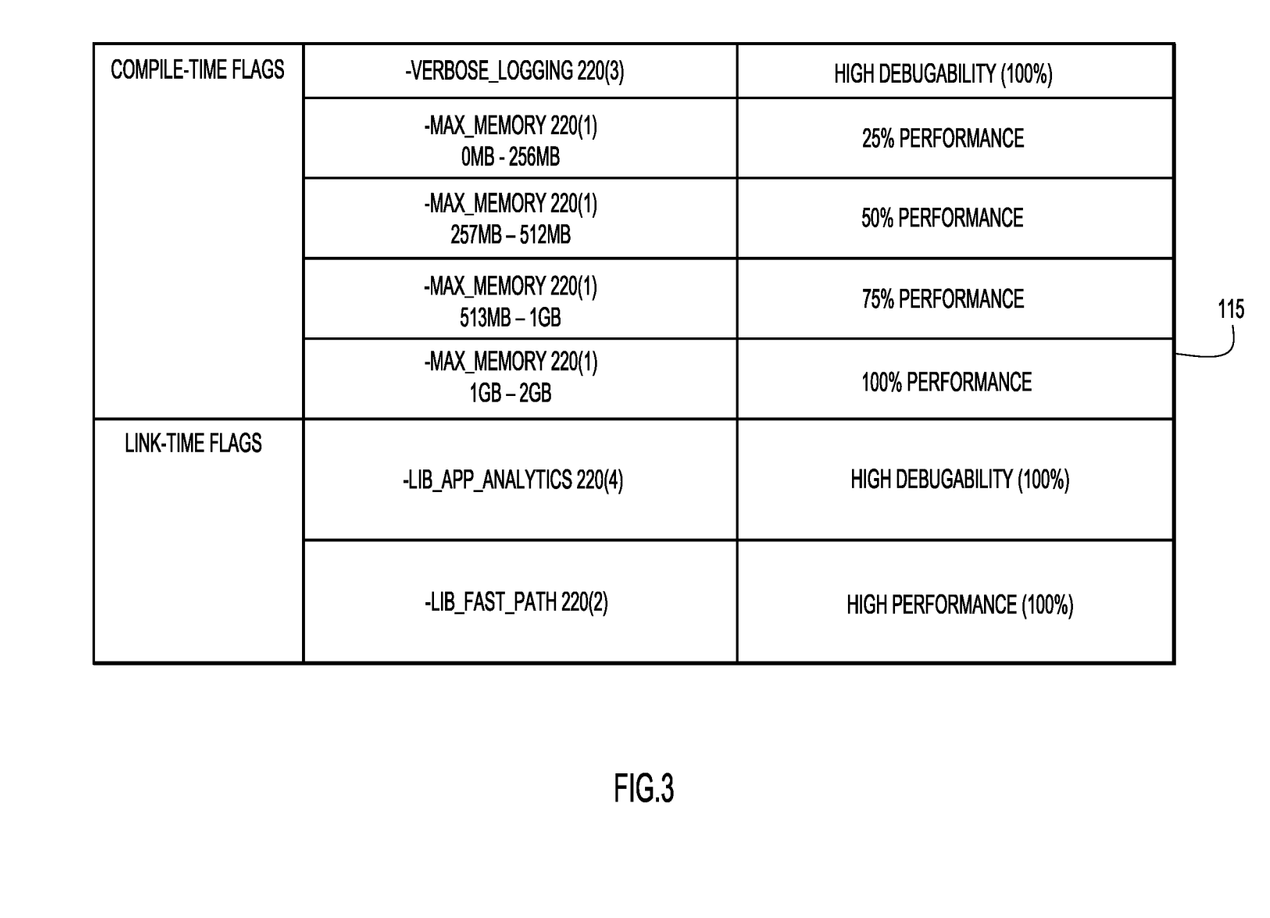
FIG. 3 is a logical representation of an expected capabilities database, according to an example embodiment.

The software image production logic 130 may cause these mappings to be stored in expected capabilities database 115. FIG. 3 is a logical representation of expected capabilities database 115. In this example, adjustable parameters 220(1)-220(4) are sorted according to whether adjustable parameters 220(1)-220(4) are compile-time flags or link-time flag. As shown, verbose_logging 220(3) and max_memory 220(1) are compile-time flags, and lib_app_analytics 220(4) and lib_fast_path 220(2) are link-time flags. The expected capabilities database 115 may also include associated software image feature grouping and compilation instructions.

Max_memory 220(1) enables tuning/adjusting how much Random Access Memory (RAM) a given software component may consume. Lib_fast_path 220(2) improves data packet throughput by providing a faster path where applicable (e.g., control protocol packets are sent to the Central Processing Unit (CPU) but data protocol packets are switched from Application-Specific Integrated Circuits (ASICs). Verbose_logging 220(3) may enable debug level trace log messages added by developers to assist debugging. Lib_app_analytics 220(4) links the software application analytics library with the software. This may track open file descriptors, database connections, respective connect/teardown times, etc. to provide insights into how the software is behaving.

As mentioned, expected capabilities database 115 stores mappings of respective settings for adjustable parameters 220(1)-220(4) to respective values that represent expected levels of capability for the respective settings for the adjustable parameters 220(1)-220(4). For example, when verbose_logging 220(3) is set to "present," the corresponding expected level of capability for debugability is high (100%). When verbose_logging 220(3) is set to "absent," the corresponding expected level of capability for debugability is low (e.g., 25%). Thus, the expected capabilities database 115 may store binary settings of verbose_logging 220(3) (e.g., absent/present) to corresponding expected levels of capability.

When max_memory 220(1) is set to 0 MB-256 MB, the corresponding expected level of capability for performance is 25%. When max_memory 220(1) is set to 257 MB-512 MB, the corresponding expected level of capability for performance is 50%. When max_memory 220(1) is set to 513 MB-1 GB, the corresponding expected level of capability for performance is 75%. When max_memory 220(1) is set to 1 GB-2 GB, the corresponding expected level of capability for performance is 100%. Thus, the expected capabilities database 115 may store respective ranges of max_memory 220(1) (e.g., 0 MB-256 MB, 257 MB-512 MB, etc.) to corresponding expected levels of capability.

When lib_app_analytics 220(4) is set to "present," the corresponding expected level of capability for debugability is high (100%). When lib_app_analytics 220(4) is set to "absent," the corresponding expected level of capability for debugability is low (e.g., 25%). Similarly, when lib_fast_path 220(2) is set to "present," the corresponding expected level of capability for debugability is high (100%), and when lib_fast_path 220(2) is set to "absent," the corresponding expected level of capability for debugability is low (e.g., 25%). Thus, the expected capabilities database 115 may also store binary settings of lib_app_analytics 220(4) and lib_fast_path 220(2) to corresponding expected levels of capability.

The software image production logic 130 may generate expected levels of capability associated with possible combinations of the settings for the adjustable parameters 220(1)-220(2) (also referred to herein as "scores"). For example, the software image production logic 130 may multiply each of the respective values that represent the expected levels of capability for the respective settings for max_memory 220(1), with each of the respective values that represent the expected levels of capability for the respective settings for lib_fast_path 220(2). The software image production logic 130 may perform this multiplication because there are multiple adjustable parameters 220(1)-220(2) that may impact aspect 215(1) (performance).

For example, possible performance scores for feature 210(1) may be as follows:

max_memory: 25%*lib_fast_path absent: (Low) 25%=6.25% max_memory: 50%*lib_fast_path absent: (Low) 25%=12.5% max_memory: 75%*lib_fast_path absent: (Low) 25%=18.5% max_memory: 100%*lib_fast_path absent: (Low) 25%=25% max_memory: 25%*lib_fast_path present: (High) 100%=25% max_memory: 50%*lib_fast_path present: (High) 100%=50% max_memory: 75%*lib_fast_path present: (High) 100%=75% max_memory: 100%*lib_fast_path present: (High) 100%=100%

Similarly, possible debugability scores for feature 210(2) may be as follows:

verbose_logging: (Low) 25%*lib_app_analytics: (Low) 25%=6.25% verbose_logging: (Low) 25%*lib_app_analytics: (High) 100%=25% verbose_logging: (High) 100%*lib_app_analytics: (Low) 25%=25% verbose_logging: (High) 100%*lib_app_analytics: (High) 100%=100%

More generally, a given feature may have adjustable parameters m and n that impact an aspect X. $S_m$ and $S_n$ may denote expected levels of capability for adjustable parameters m and n on X, respectively. Thus, the score of aspect X ($S_x$) may be computed based on scores of parameters m and n as: $S_x = S_m * S_n$. The software image production logic 130 may cause these scores to be stored in a scores table (e.g., in expected capabilities database 115).

The user may specify a desired level of capability for aspect 215(1) (performance) of feature 210(1) via the client device, as represented by arrow 135 in FIG. 1. In one example, if an accurate desired percentage is unknown, the user may specify a desired level of capability in terms of qualitative instructions in natural language (e.g., low/medium/high). Thus, the user need not provide an exact numerical/quantitative value for each aspect of a feature. Scores for any features not specified by the user may be auto-generated by the software image production logic 130 (e.g., default 50%).

For example, the user may provide the following text: "I want feature Foo with medium performance." The software image production logic 130 may interpret "medium performance" as 50% performance. Based on this interpretation, the software image production logic 130 may identify a particular expected level of capability associated with a particular possible combination of the settings for adjustable parameters 220(1)-220(2). The particular expected level of capability may be closer to the desired level of capability than the other expected levels of capability. For example, the software image production logic 130 may identify 50% as the expected level of capability. In this example, the associated particular possible combination of the settings is the max_memory 220(1) set to 257 MB-512 MG, and the lib_fast_path present 220(2) set to "present".

Thus, the software image production logic 130 may produce software image 205 that includes the max_memory 220(1) set to 257 MB-512 MG, and the lib_fast_path present 220(2) set to "present". The client device 105 may download the software image 205 from the production server 110 at arrow 140.

In a further example, the user may provide the following text: "I want feature Foo with medium performance and low debugability." In one example, the software image production logic 130 may interpret "low debugability" as 25% performance. Based on this interpretation, the software image production logic 130 may identify a particular expected level of capability (here, 25%) associated with a particular possible combination of the settings for adjustable parameters 220(3)-220(4). The particular expected level of capability may be closer to the desired level of capability than the other expected levels of capability.

In this example, there are two possible combinations that yield 25% debugability. The first combination is verbose_logging: (Low) 25%*lib_app_analytics: (High) 100%=25%. The second combination is verbose_logging: (High) 100%*lib_app_analytics: (Low) 25%=25%. Accordingly, software image production logic 130 may initiate a tie-break procedure to determine which combination should be selected. In one example, the combination that is used to create the highest number of previously generated software images may be selected. The software image production server 110 may maintain a database to store combinations used for previously generated software images. If both combinations have been used in an equal number of previously generated software images, either combination may be randomly selected for use in the software image.

In another example, the software image production logic 130 may interpret "low debugability" as the lowest debugability score. Alternatively, the user may input "no debugability," which also causes the software image production logic 130 to search for the combination with the lowest score. In this example, the lowest possible debugability score is 6.25%, and the associated combination of the settings is both the verbose_logging 220(3) and the lib_app_analytics 220(4) set to "absent".

Therefore, the software image production logic 130 may produce software image 205 that includes the max_memory 220(1) set to 257 MB-512 MG, and the lib_fast_path present 220(2) set to "present," and also includes both the verbose_logging 220(3) and the lib_app_analytics 220(4) set to "absent". As mentioned, the client device 105 may download the software image 205 from the software image production server 110 at arrow 140.

In one example, the software image production server 110 may determine an actual level of capability for an aspect (e.g., performance 215(1)) of the software image 205. The software image production server 110 may compute a weighted average of the actual level of capability and the particular expected level of capability. The weighted average may be used for automatically producing subsequent software images.

Feature statistics related to the actual capabilities of the software image may be tracked to obtain observed values for various aspects (e.g., performance, stability, etc.). These observed values may be converted to scores or other values, stored in the actual capabilities database 125, and used to update the expected capabilities database 115. For instance, in the above example, if the observed performance score in the above example was 30%, a new expected performance score may be computed as a weighted average of the expected and observed performance score:

½*(expected performance score: 50%+observed performance score: 30%)=40%

Thus, for subsequent software images having max_memory set to 257 MB-512 MB and lib_fast_path set to "present," the expected performance score will be 40% (instead of 50%).

There are several ways the software image production server 110 may obtain an observed performance score. First, a curated rating/feedback method may be implemented, in which the software vendor may use a manually curated rating to specify the actual level of capabilities of the software image against the expected/desired level of capabilities of the software image. The software image production server 110 may also/alternatively collect feedback from existing users/deployments in the form of ratings associated with the actual level of capabilities.

Second, in an automatic rating method, the software vendor may automatically run/deploy and test the software image using, for example, Continuous Integration-Continuous Deployment (CICD)/Jenkins techniques. The results from such automated tests may be used to determine an actual level of capability of an aspect of the software image.

Third, the software image production server 110 may accept recommendations from related deployments. In one example, a knowledge base may be created by analyzing existing deployments of software to characterize grouping combinations to achieve performance, debug-ability, data usage, speed of operation, etc. Machine learning processes may provide recommendations by comparing the expected levels of capabilities against the knowledge base.

Thus, the software vendor may use a rating mechanism (e.g., actual levels of capability) to further enhance the scoring mechanism for software images described herein. As mentioned, actual capabilities database 125 may maintain/store the feedback and rating information gathered from these manual and/or automated mechanisms.

Other aspects of features 210(1)-210(N) may include stability, latency, and resources/environment. The stability (reliability) of a software image feature may be based on information from the software vendor. For instance, the software vendor may mark an individual software image feature as "verified," "beta," or "experimental." The software image production logic 130 may thus produce the software image 205 based on the desired level of stability (e.g., "works perfectly," "works acceptably," etc.).

In certain examples, the user may desire the software image 205 to include only software image features 210(1)-210(N) that have been previously verified for compatibility with each other. As such, in one example, the software vendor may mark various combinations of features as "verified," "beta," or "experimental" (in order from most to least stable), and the user may specify (e.g., at 135) the desired level of stability for the combinations of software image features. The previously verified combinations database 120 may include information regarding which combinations of software image features 210(1)-210(N) have been previously verified. If the user indicates (e.g., at 135) that the software image 205 should include only software image features 210(1)-210(N) that have been previously verified for compatibility with each other, the software image production logic 130 may check that feature 210(1) having the particular combination of settings discussed above are compatible with features 210(2)-210(N), before producing software image 205.

The latency feature may enable the user to control faster inter-software image feature communication time as well as overall response time. This may include combining software image features in such a way that the inter-software image feature communication latency is reduced (e.g., within an address space).

The deployment resources/environment may be optimized for the Central Processing Unit (CPU), memory, or storage. This may include building software images with a special compilation, or using specially optimized images. Thus, the software image may be compiled to fit the deployment environment.

Software image production logic 130 may also/alternatively produce software image 205 based on the priority of certain software image features over others. In one example, a user desires excellent performance and latency, but only one of those software image features can be "excellent" in this software image. Here, the software image production logic 130 may determine that the performance of the software image should be prioritized over the latency of the software image, and therefore produces a software image with excellent performance and only average latency.

Described below is another example of automatically producing a software image. In this example, the software image is for virtualized routing, such as for Cisco Systems, Inc.'s Cloud Services Router 1000V (CSR1KV). Instead of downloading single monolithic software images with pre-packaged features, users may provide desired levels of capability for various aspects of features of the software image. The best (e.g., closest to desired levels of capability) software image may be provided based on the desired levels of capability.

The user may specify one or more desired levels of capability for aspects of features of the software image (e.g., by providing a list of software features). This may include stability of software images, performance, latency, deployment environment, etc. The user may also specify the problem to solve (e.g., a networking system, Domain Specific Language (DSL), or other implementation-independent description of a desired functionality of the software image). The software image production server may score the problem to solve as "delivers functionality" or "does not deliver functionality".

This information may be gathered at the client device 105 during a container build creation (e.g., using a DSL/container compose file). The container compose file may be used to specify desired levels of capability for the CSR1KV. An example YAML Ain't Markup Language (YAML) file is provided below. In one example, the YAML file is included in the container compose file. In another example, the YAML file is separate from the container compose file.

```
Stability: Experimental
Feature: Firewall
    Optimize: Latency
Feature: DHCP
    Optimize:
        Debugability
        Performance
    Subfeature: IPv6
Feature: NAT
    Optimize: Performance
```

The user may write the YAML file in order to specify desired software features. Such features may include firewall, DHCP, NAT, etc. Optimization characteristics may be specified, such as one or more of size, performance, speed/latency, debugability, etc. Higher level editors and tools may help generate the YAML file from user inputs.

The software image production server 110 may receive the YAML file as an input. Upon receiving the YAML file, a container image repository on the software image production server 110 may enable the dynamic production of software images. The software image production server 110 may also/alternatively include a VNF software image repository to enable the dynamic production of software images. The client device 105 may include a portal to download software images from server 110.

Figure 4A:
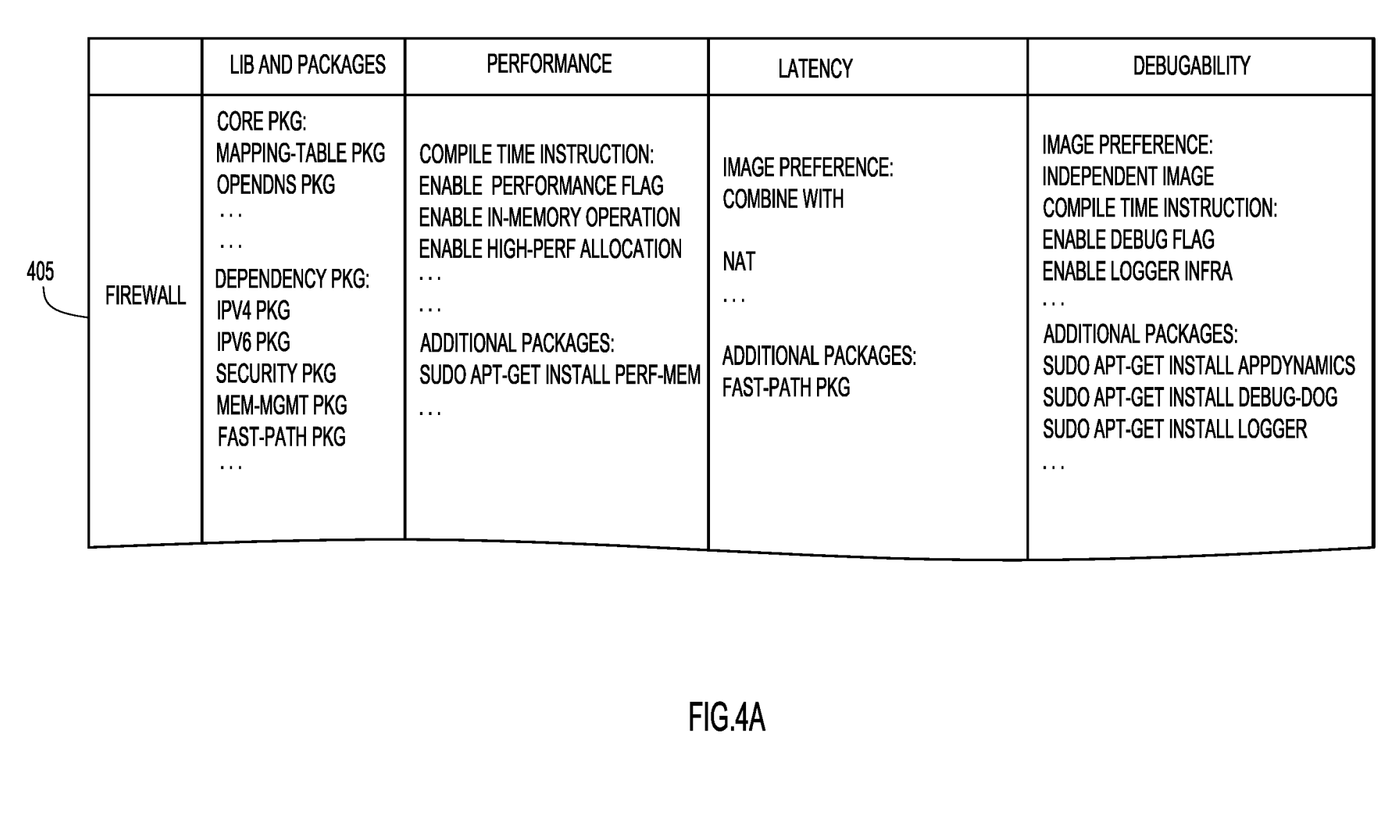
FIGS. 4A-4C are a logical representation of another expected capabilities database, according to an example embodiment.
Figure 4B:
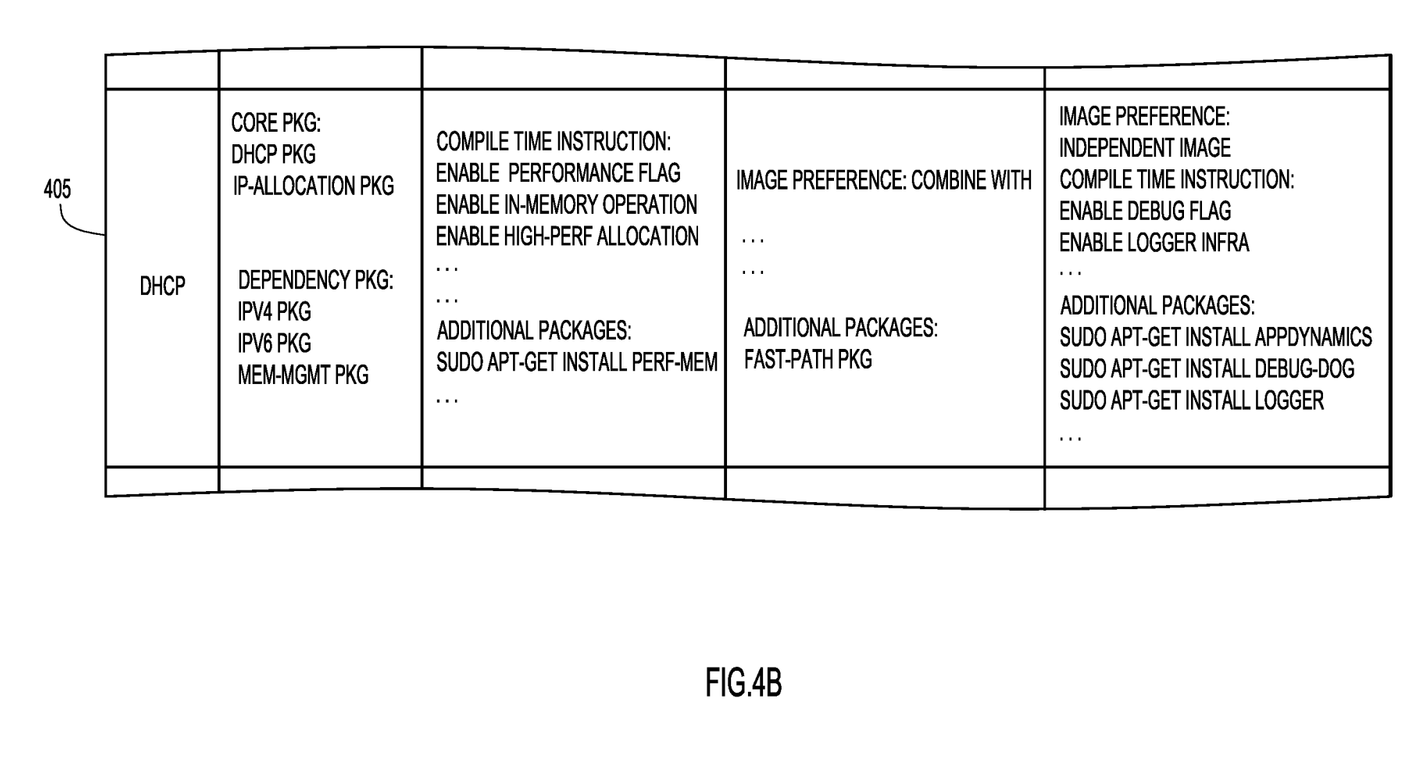
Figure 4C:
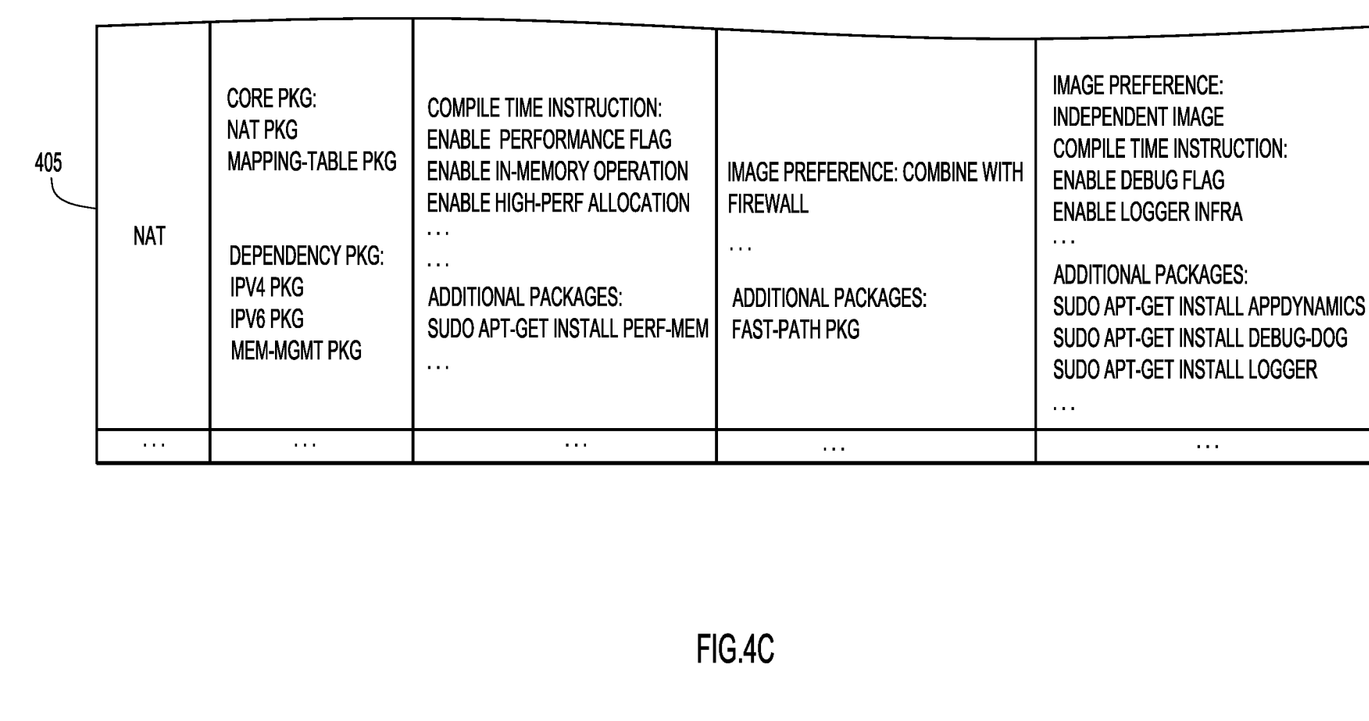

The desired levels of capability may be examined/determined by software image production logic, which may use input from one or more databases (e.g., a previously verified combinations database) to automatically produce a corresponding software image. In one example, the software image production logic may produce expected capabilities database 405 based on the input, as shown in FIGS. 4A-4C.

The expected capabilities database 405 may be maintained by the software vendor and may be manually curated or learned from existing deployments. The expected capabilities database 405 may include an instruction set explaining which packages to include, special compile instructions, recommendations for grouping features together in a single software image, etc. In this example, based on the desired levels of capability for aspects of features of the CSR1KV, the appropriate software image features may be determined. As described herein, software image production logic may translate the user's desired level of capabilities into software image features and corresponding libraries, packages, and compilation information.

In this example, the user desired the DHCP feature to be highly debugable. The software image production logic may therefore determine that the DHCP feature should be separate/independent from the other features. The DHCP feature may be included according to the instructions specified in the DHCP-Performance block of the expected capabilities database 405. The firewall feature may be combined with the NAT feature, as indicated in the firewall and NAT feature latency blocks, because the firewall and NAT feature performance blocks are identical. As such, common libraries and packages from these two features may be used to create a firewall/NAT software image feature.

Therefore, two independent software image features may be created: one for the DHCP feature and associated DHCP library and packages, and the other for the combined firewall and NAT feature and associated common libraries and packages. This information may be cross-checked with an actual capabilities database and rating information to determine the best possible combination/score for the user. Thus, based on the user-provided desired levels of capabilities, as well as software image feature grouping and building information, one or more software images may be dynamically built and sent to the user.

Figure 5:
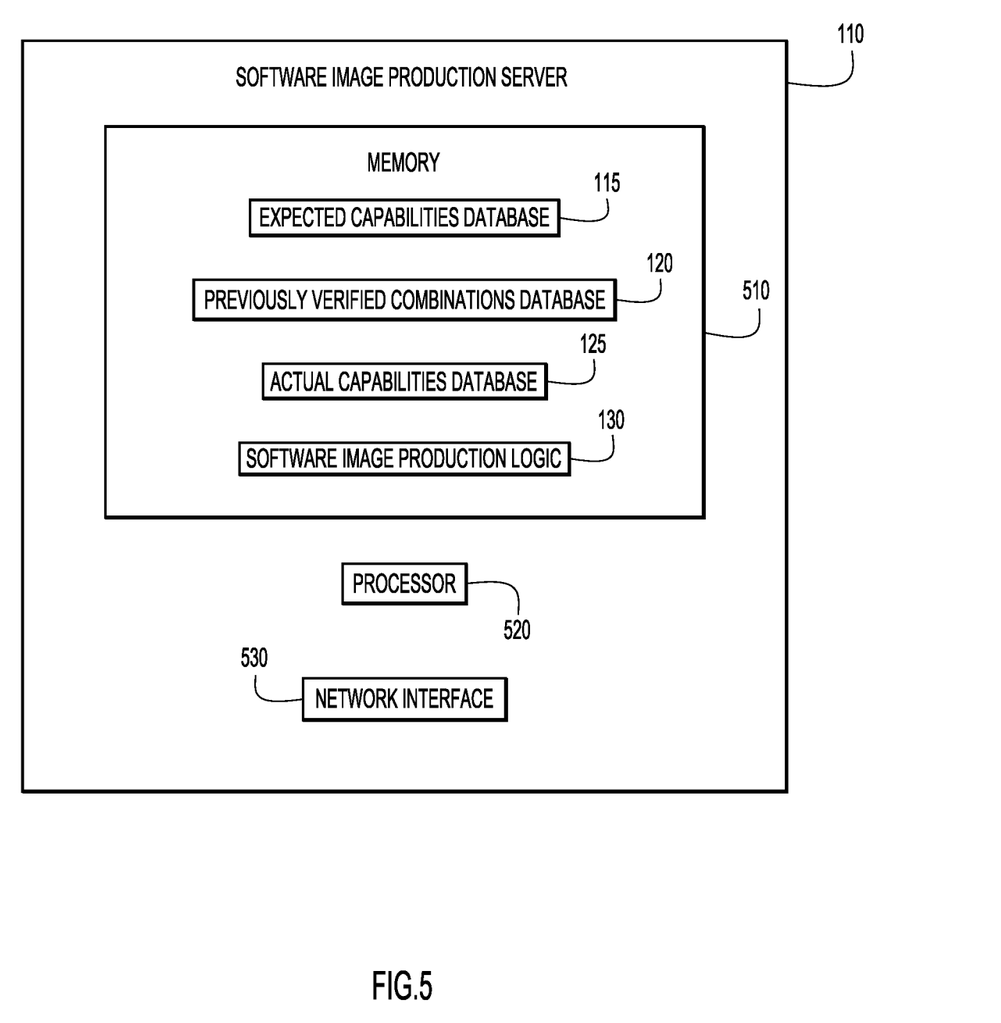
FIG. 5 is a block diagram of a software image production server configured to execute software image production techniques, according to an example embodiment.

FIG. 5 is a block diagram of software image production server 110 configured to automatically produce software images. In this example, the software image production server 110 includes a memory 510, one or more processors 520, and a network interface 530. The memory 510 may include expected capabilities database 115, previously verified combination database 120, actual capabilities database 125, and software image production logic 130.

The one or more processors 520 are configured to execute instructions stored in the memory 510 (e.g., software image production logic 130). When executed by the one or more processors 520, the software image production logic 130 enables the software image production server 110 to automatically produce software images. The network interface 530 is a network interface card or other network interface device that enables network communications on behalf of the software image production server 110.

The memory 510 may be read only memory (ROM), random access memory (RAM), magnetic disk storage media devices, optical storage media devices, flash memory devices, electrical, optical, or other physical/tangible memory storage devices. Thus, in general, the memory 510 may comprise one or more tangible (non-transitory) computer readable storage media (e.g., a memory device) encoded with software comprising computer executable instructions and when the software is executed (by the processor 520) it is operable to perform the operations described herein.

Figure 6:
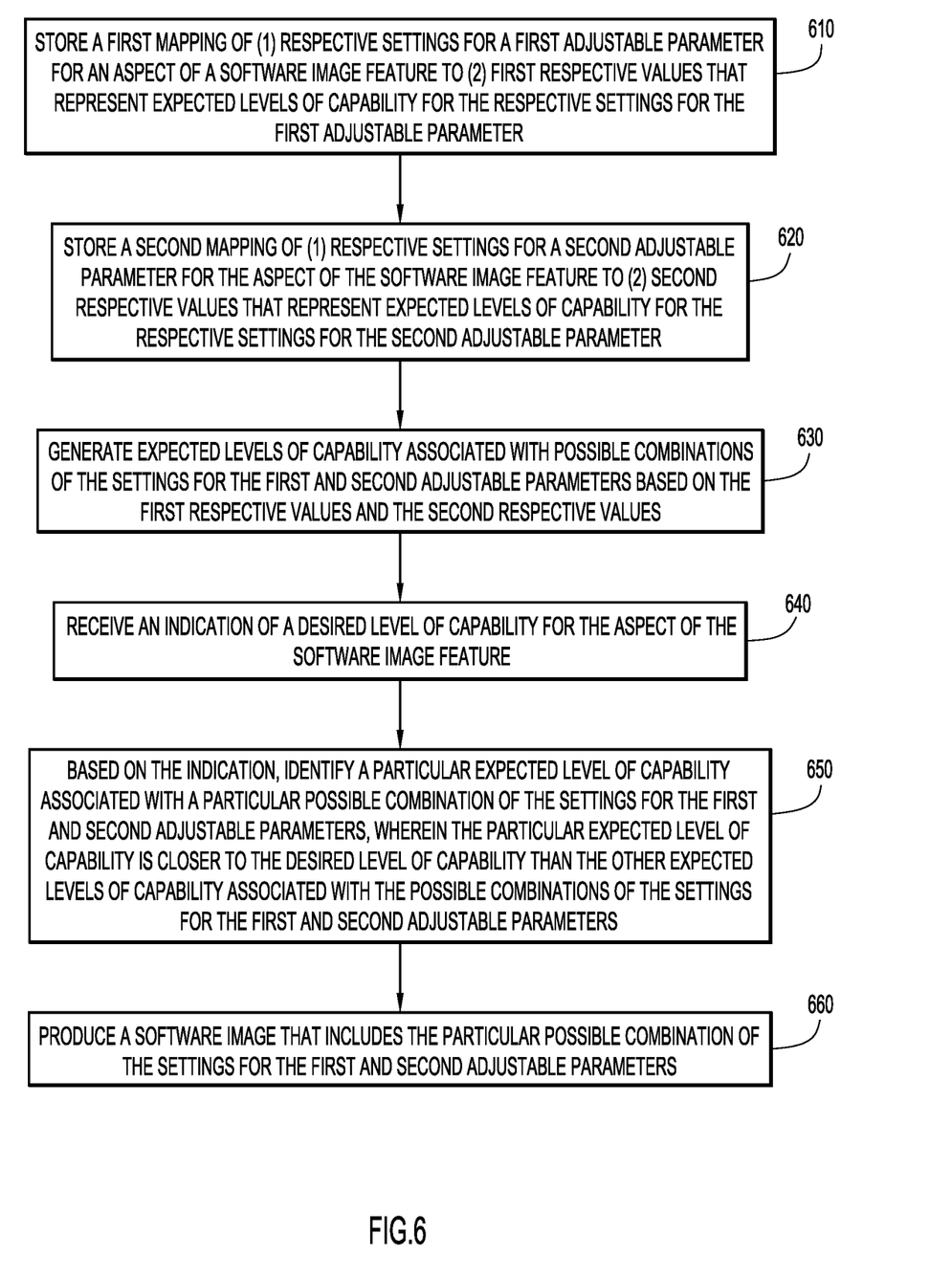
FIG. 6 is a flowchart of a method for automatically producing software images, according to an example embodiment.

FIG. 6 is a flowchart of a method for automatically producing a software image in accordance with examples presented herein. In one example, software image production server 110 performs this method. At 610, software image production server 110 stores a first mapping of (1) respective settings for a first adjustable parameter for an aspect of a software image feature to (2) first respective values that represent expected levels of capability for the respective settings for the first adjustable parameter. At 620, software image production server 110 stores a second mapping of (1) respective settings for a second adjustable parameter for the aspect of the software image feature to (2) second respective values that represent expected levels of capability for the respective settings for the second adjustable parameter. At 630, software image production server 110 generates expected levels of capability associated with possible combinations of the settings for the first and second adjustable parameters based on the first respective values and the second respective values.

At 640, the software image production server 110 receives an indication of a desired level of capability for the aspect of the software image feature. At 650, based on the indication, the software image production server 110 identifies a particular expected level of capability associated with a particular possible combination of the settings for the first and second adjustable parameters, wherein the particular expected level of capability is closer to the desired level of capability than the other expected levels of capability associated with the possible combinations of the settings for the first and second adjustable parameters. The particular expected level of capability is closer to a desired level of capability for the aspect of the software image feature than the other expected levels of capability associated with the possible combinations of the settings for the first and second adjustable parameters. At 660, software image production server 110 produces a software image that includes the particular possible combination of the settings for the first and second adjustable parameters.

Generally, a software image may have a total of N features (e.g., Foo, firewall, DHCP, NAT, etc.). Each feature may have M aspects (e.g., performance, debugability, stability, etc.), and each aspect may have K settings for adjustable parameters (e.g., high/low, percentage, etc.). Thus, there may be a total of $((K^M)^N)$ possible combinations of settings for the software image. Even for a software image having only ten features, each of which has two aspects, each of which has two settings, there may be 10,000 possible ways to produce the software image. It is impractical to pre-build this many software images, or expect users to specify values for aspects and settings for all features, or manually translate a desired level of capabilities for various features of the software image to the correct set of aspects and settings for the adjustable parameters.

The techniques presented herein address these problems by providing an automated approach to software image delivery/deployment. A user may convey a desired level of capability for an aspect of a software image feature. This desired level of capability may be conveyed to the software image production server, and the software image production server may dynamically build/package the software image based on the desired level of capability, and deliver the software image to the user. This automated software preparation/packaging benefits users by reducing the effort and time required to unpack, configure, and test software. This also benefits software vendors by providing faster preparation and delivery of software images according to user specifications.

Faster and phased software functionality delivery is enabled with a more modular approach than monolithic delivery. In addition, the software images may have a smaller footprint when only the required software image features are included in the produced software image. The software image may be a more efficient output because the software image closely matches user requirements. This is a more intuitive way of requesting software image requirements.

The techniques described herein may automatically produce the best/most desirable software image for a user, and the appropriate deployment and networking mechanisms, based on user requirements. The produced software image may be selected from prebuilt and/or dynamically constructed possibilities. The system may use a scoring mechanism that applies across various aspects of software image features to produce the best software image for the user. Instead of requiring the user to specify a precise set of required networking or software components, the system permits the user to specify desired levels of capability in an intuitive manner. The system may further automatically produce the best software image for the user.

In one form, a method is provided. The method comprises: storing a first mapping of respective settings for a first adjustable parameter for an aspect of a software image feature to first respective values that represent expected levels of capability for the respective settings for the first adjustable parameter; storing a second mapping of respective settings for a second adjustable parameter for the aspect of the software image feature to second respective values that represent expected levels of capability for the respective settings for the second adjustable parameter; generating expected levels of capability associated with possible combinations of the settings for the first and second adjustable parameters based on the first respective values and the second respective values; receiving an indication of a desired level of capability for the aspect of the software image feature; based on the indication, identifying a particular expected level of capability associated with a particular possible combination of the settings for the first and second adjustable parameters, wherein the particular expected level of capability is closer to the desired level of capability than the other expected levels of capability associated with the possible combinations of the settings for the first and second adjustable parameters; and producing a software image that includes the particular possible combination of the settings for the first and second adjustable parameters.

In another form, an apparatus is provided. The apparatus comprises: a network interface that enables network communications on behalf of the apparatus; memory; and one or more processors coupled to the network interface and the memory, wherein the one or more processors are configured to: store a first mapping of respective settings for a first adjustable parameter for an aspect of a software image feature to first respective values that represent expected levels of capability for the respective settings for the first adjustable parameter; store a second mapping of respective settings for a second adjustable parameter for the aspect of the software image feature to second respective values that represent expected levels of capability for the respective settings for the second adjustable parameter; generate expected levels of capability associated with possible combinations of the settings for the first and second adjustable parameters based on the first respective values and the second respective values; receive an indication of a desired level of capability for the aspect of the software image feature; based on the indication, identify a particular expected level of capability associated with a particular possible combination of the settings for the first and second adjustable parameters, wherein the particular expected level of capability is closer to the desired level of capability than the other expected levels of capability associated with the possible combinations of the settings for the first and second adjustable parameters; and produce a software image that includes the particular possible combination of the settings for the first and second adjustable parameters.

In another form, one or more non-transitory computer readable storage media are provided. The non-transitory computer readable storage media are encoded with instructions that, when executed by a processor, cause the processor to: store a first mapping of respective settings for a first adjustable parameter for an aspect of a software image feature to first respective values that represent expected levels of capability for the respective settings for the first adjustable parameter; store a second mapping of respective settings for a second adjustable parameter for the aspect of the software image feature to second respective values that represent expected levels of capability for the respective settings for the second adjustable parameter; generate expected levels of capability associated with possible combinations of the settings for the first and second adjustable parameters based on the first respective values and the second respective values; receive an indication of a desired level of capability for the aspect of the software image feature; based on the indication, identify a particular expected level of capability associated with a particular possible combination of the settings for the first and second adjustable parameters, wherein the particular expected level of capability is closer to the desired level of capability than the other expected levels of capability associated with the possible combinations of the settings for the first and second adjustable parameters; and produce a software image that includes the particular possible combination of the settings for the first and second adjustable parameters.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
storing a first mapping of respective settings for a first adjustable parameter for an aspect of a software image feature to first respective values that represent expected levels of capability for the respective settings for the first adjustable parameter;
storing a second mapping of respective settings for a second adjustable parameter for the aspect of the software image feature to second respective values that represent expected levels of capability for the respective settings for the second adjustable parameter;
generating expected levels of capability associated with possible combinations of the settings for the first and second adjustable parameters based on the first respective values and the second respective values, wherein generating the expected levels of capability associated with the possible combinations of the settings for the first and second adjustable parameters includes multiplying each of the first respective values with each of the second respective values;
receiving an indication of a desired level of capability for the aspect of the software image feature;
based on the indication, identifying a particular expected level of capability associated with a particular possible combination of the settings for the first and second adjustable parameters, wherein the particular expected level of capability is closer to the desired level of capability than other expected levels of capability associated with the possible combinations of the settings for the first and second adjustable parameters;
producing a software image that includes the particular possible combination of the settings for the first and second adjustable parameters and another software image feature that has been previously verified for compatibility with the software image feature;
determining an actual level of capability for the aspect of the software image;
computing a weighted average of the actual level of capability and the particular expected level of capability; and
automatically producing one or more subsequent software images based on the weighted average.

2. The method of claim 1, wherein:
producing the software image includes producing a software image that includes a particular possible combination of settings for third and fourth adjustable parameters for another aspect of the software image feature.

3. The method of claim 1, wherein:
storing the first mapping includes storing a mapping of respective ranges of the first adjustable parameter to the first respective values.

4. The method of claim 1, wherein:
storing the first mapping includes storing a mapping of binary settings of the first adjustable parameter to the first respective values.

5. The method of claim 1, wherein:
the first and second respective values include first and second respective percentage values.

6. The method of claim 1, wherein the aspect of the software image feature includes performance.

7. The method of claim 1, wherein the aspect of the software image feature includes debugability.

8. An apparatus comprising:
a network interface that enables network communications on behalf of the apparatus;
memory; and
one or more processors coupled to the network interface and the memory, wherein the one or more processors are configured to:
store a first mapping of respective settings for a first adjustable parameter for an aspect of a software image feature to first respective values that represent expected levels of capability for the respective settings for the first adjustable parameter;
store a second mapping of respective settings for a second adjustable parameter for the aspect of the software image feature to second respective values that represent expected levels of capability for the respective settings for the second adjustable parameter;
generate expected levels of capability associated with possible combinations of the settings for the first and second adjustable parameters based on the first respective values and the second respective values by multiplying each of the first respective values with each of the second respective values;
receive an indication of a desired level of capability for the aspect of the software image feature;
based on the indication, identify a particular expected level of capability associated with a particular possible combination of the settings for the first and second adjustable parameters, wherein the particular expected level of capability is closer to the desired level of capability than other expected levels of capability associated with the possible combinations of the settings for the first and second adjustable parameters;
produce a software image that includes the particular possible combination of the settings for the first and second adjustable parameters and another software image feature that has been previously verified for compatibility with the software image feature;
determine an actual level of capability for the aspect of the software image;
compute a weighted average of the actual level of capability and the particular expected level of capability; and
automatically produce one or more subsequent software images based on the weighted average.

9. The apparatus of claim 8, wherein:
the one or more processors are configured to produce the software image by producing a software image that includes a particular possible combination of settings for third and fourth adjustable parameters for another aspect of the software image feature.

10. The apparatus of claim 8, wherein:
the one or more processors are configured to store the first mapping by storing a mapping of respective ranges of the first adjustable parameter to the first respective values.

11. The apparatus of claim 8, wherein:
the one or more processors are configured to store the first mapping by storing a mapping of binary settings of the first adjustable parameter to the first respective values.

12. The apparatus of claim 8, wherein:
the first and second respective values include first and second respective percentage values.

13. The apparatus of claim 8, wherein the aspect of the software image feature includes performance.

14. The apparatus of claim 8, wherein the aspect of the software image feature includes debugability.

15. One or more non-transitory computer readable storage media encoded with instructions that, when executed by a processor, cause the processor to:
store a first mapping of respective settings for a first adjustable parameter for an aspect of a software image feature to first respective values that represent expected levels of capability for the respective settings for the first adjustable parameter;
store a second mapping of respective settings for a second adjustable parameter for the aspect of the software image feature to second respective values that represent expected levels of capability for the respective settings for the second adjustable parameter;
generate expected levels of capability associated with possible combinations of the settings for the first and second adjustable parameters based on the first respective values and the second respective values by multiplying each of the first respective values with each of the second respective values;
receive an indication of a desired level of capability for the aspect of the software image feature;
based on the indication, identify a particular expected level of capability associated with a particular possible combination of the settings for the first and second adjustable parameters, wherein the particular expected level of capability is closer to the desired level of capability than other expected levels of capability associated with the possible combinations of the settings for the first and second adjustable parameters;
produce a software image that includes the particular possible combination of the settings for the first and second adjustable parameters and another software image feature that has been previously verified for compatibility with the software image feature;
determine an actual level of capability for the aspect of the software image;
compute a weighted average of the actual level of capability and the particular expected level of capability; and
automatically produce one or more subsequent software images based on the weighted average.

16. The one or more non-transitory computer readable storage media of claim 15, wherein:
the instructions that cause the processor to produce the software image include instructions that cause the processor to produce a software image that includes a particular possible combination of settings for third and fourth adjustable parameters for another aspect of the software image feature.

17. The one or more non-transitory computer readable storage media of claim 15, wherein the instructions that cause the processor to store the first mapping include instructions that cause the processor to:
store a mapping of respective ranges of the first adjustable parameter to the first respective values.

18. The one or more non-transitory computer readable storage media of claim 15, wherein the instructions that cause the processor to store the first mapping include instructions that cause the processor to:
store a mapping of binary settings of the first adjustable parameter to the first respective values.

19. The one or more non-transitory computer readable storage media of claim 15, wherein:
the first and second respective values include first and second respective percentage values.

20. The one or more non-transitory computer readable storage media of claim 15, wherein the aspect of the software image feature includes performance or debugability.

* * * * *